United States Patent [19]

Crandall

[11] Patent Number: 4,857,955
[45] Date of Patent: Aug. 15, 1989

[54] ELECTRONIC PRINTER APPARATUS WITH INTELLIGENT ACCENT COLOR

[75] Inventor: Robert P. Crandall, Webster, N.Y.

[73] Assignee: Eastman Kodak Company, Rochester, N.Y.

[21] Appl. No.: 101,903

[22] Filed: Sep. 28, 1987

[51] Int. Cl.[4] ...................... G03G 15/01; G03G 15/00; G01D 15/06; G06F 15/40
[52] U.S. Cl. ..................................... 355/328; 346/157; 346/160; 355/14 R; 364/518; 364/526
[58] Field of Search ................... 346/157; 358/75, 78, 358/80, 282; 364/518, 523; 382/17, 61; 340/703, 709, 715; 355/4, 7, 14 C, 14 R

[56] References Cited

U.S. PATENT DOCUMENTS

| | | | |
|---|---|---|---|
| 3,045,644 | 7/1962 | Schwertz | 355/4 X |
| 3,408,458 | 10/1968 | Hennis | 382/61 X |
| 3,914,043 | 10/1975 | McVeigh | 355/4 |
| 3,930,724 | 1/1976 | McVeigh | 355/7 |
| 3,960,445 | 6/1976 | Drawe | 355/4 |
| 4,189,224 | 2/1980 | Sakai . | |
| 4,264,185 | 4/1981 | Ohta . | |
| 4,416,533 | 11/1983 | Tokunaga et al. . | |
| 4,509,850 | 8/1983 | Weigl | 355/4 |
| 4,571,069 | 2/1986 | Kimura et al. | 355/14 R |
| 4,639,791 | 1/1987 | Masaki | 364/523 X |
| 4,648,028 | 3/1987 | DeKoltz et al. | 340/715 X |
| 4,651,175 | 3/1987 | Tazaki | 358/75 X |
| 4,711,557 | 12/1987 | Watanabe | 355/7 X |
| 4,721,978 | 1/1988 | Herley | 355/4 |
| 4,739,377 | 4/1988 | Allen | 355/133 |
| 4,740,818 | 4/1988 | Tsilibes et al. . | |

FOREIGN PATENT DOCUMENTS

| | | | |
|---|---|---|---|
| 57-119379 | 7/1982 | Japan . | |
| 58-60350 | 4/1983 | Japan | 364/519 |
| 58-140886 | 8/1983 | Japan | 364/519 |
| 58-224362 | 12/1983 | Japan . | |
| 59-87470 | 5/1984 | Japan . | |
| 60-254221 | 12/1985 | Japan | 364/519 |
| 03707 | 6/1987 | World Int. Prop. O. . | |

Primary Examiner—A. T. Grimley
Assistant Examiner—E. Pipala
Attorney, Agent, or Firm—Norman Rushefsky

[57] ABSTRACT

An electronic printer apparatus is coupled to an electronic data source that generates electronic data signals that have no information associated with it as to the colors the respective data are to be printed in. The printer includes a computer that is programmed by the operator to compare incoming data signals and identify those characters that are to be printed in a color other than that which it prints the remaining portion of the information to provide hard copy reproductions with color accenting of selected data. In another embodiment all the data is printed in one color but the selected data is highlighted by color around the data. In still another embodiment, data signals for printing a multiple page document are compared. The fixed data on each page is printed in one color and the variable data on each page is color accented.

3 Claims, 7 Drawing Sheets

4,857,955

ELECTRONIC PRINTER APPARATUS WITH INTELLIGENT ACCENT COLOR

1. FIELD OF THE INVENTION

This invention relates to an electronic printer that produces hard copy prints of more than one color from electronic data signals.

2. DESCRIPTION OF THE PRIOR ART

Computers, word processors, image scanners, facsimile machines are well known as providing electronic data signals from which hard copy prints are generated by suitable printers. Where the printers are multicolored, prints of the data may be provided in multiple colors. However, to do so the incoming data signals to the printer need to have associated with them additional data indicating the color that the data are to be printed in. An example of such a prior art printer is disclosed in U.S. Pat. No. 4,416,533. This patent discloses a printer for printing with either of two colors so that certain information on a hard copy will be printed in a color different from that of the other information. This is particularly desirable in printing accounting information where losses are desirably highlighted in red while other data are printed in black. Color highlighting of data is particularly desirable in other fields as well to bring the reader's attention to certain data of interest. Heretofore, it has been required that data signals contain the instructions to the printer to instruct the printer that the data are to be printed in a highlighted color. This presents an inconvenience to reproducing electronic data that is already stored on for example magnetic media and for which hard copies are desired.

It is at times also desirable to be able to readily identify variable data appearing in a multiple page document which also contains information that is the same from the page to page. Such may be present in computer printouts of reports or experimental data. While one can read the document to attempt to ascertain the variable data, the apparatus of the invention is highly suited to making this task simpler.

SUMMARY

The objects of the invention are to overcome the above deficiencies of the prior art. These and other objects are achieved by a printer apparatus comprising:

means for providing data signals representing non-color differentiated character data information to be printed;

first means for establishing a character accent color criteria;

second means for comparing the said data signals with the said criteria;

third means responsive to data signals meeting the criteria for printing the said character data information so that data signals meeting the criteria have their corresponding character data information color highlighted on a record member.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Because apparatus of the type described herein are well known, the present description will be directed in particular to elements forming part of or cooperating more directly with the present invention.

Figure 1:
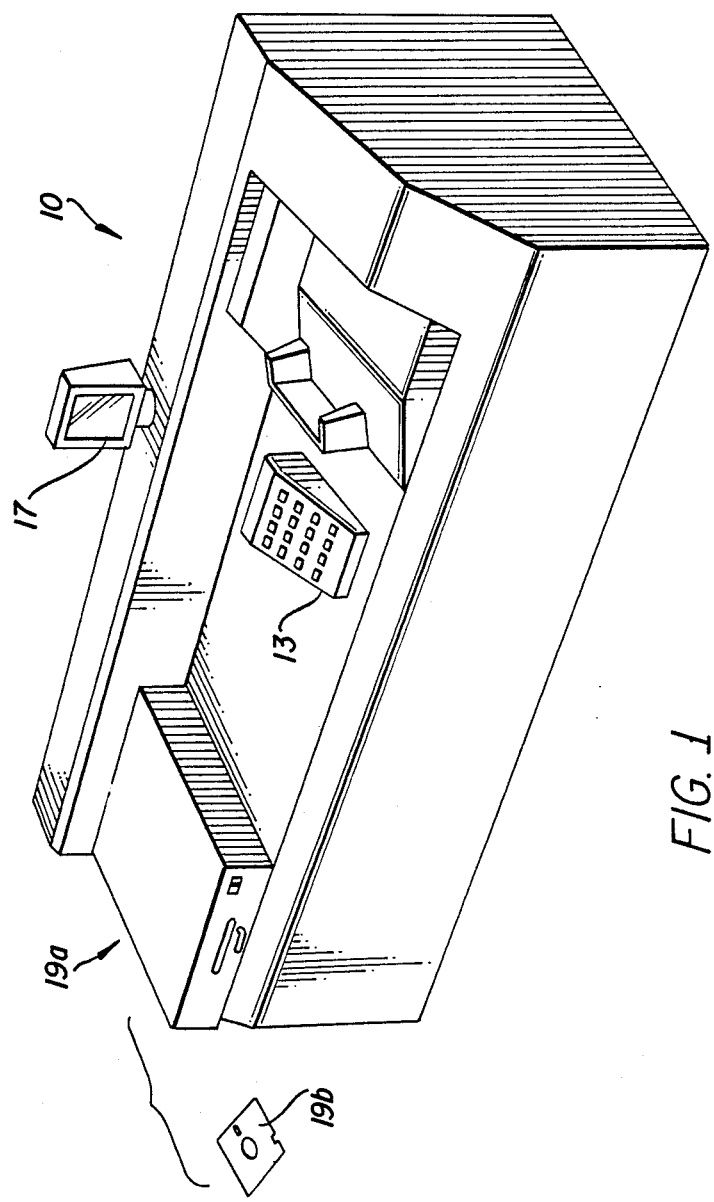
FIG. 1 is a schematic perspective view of a two-color printer apparatus for producing accent colored hard copy prints from electronic data signals in accordance with the invention.
Figure 2:
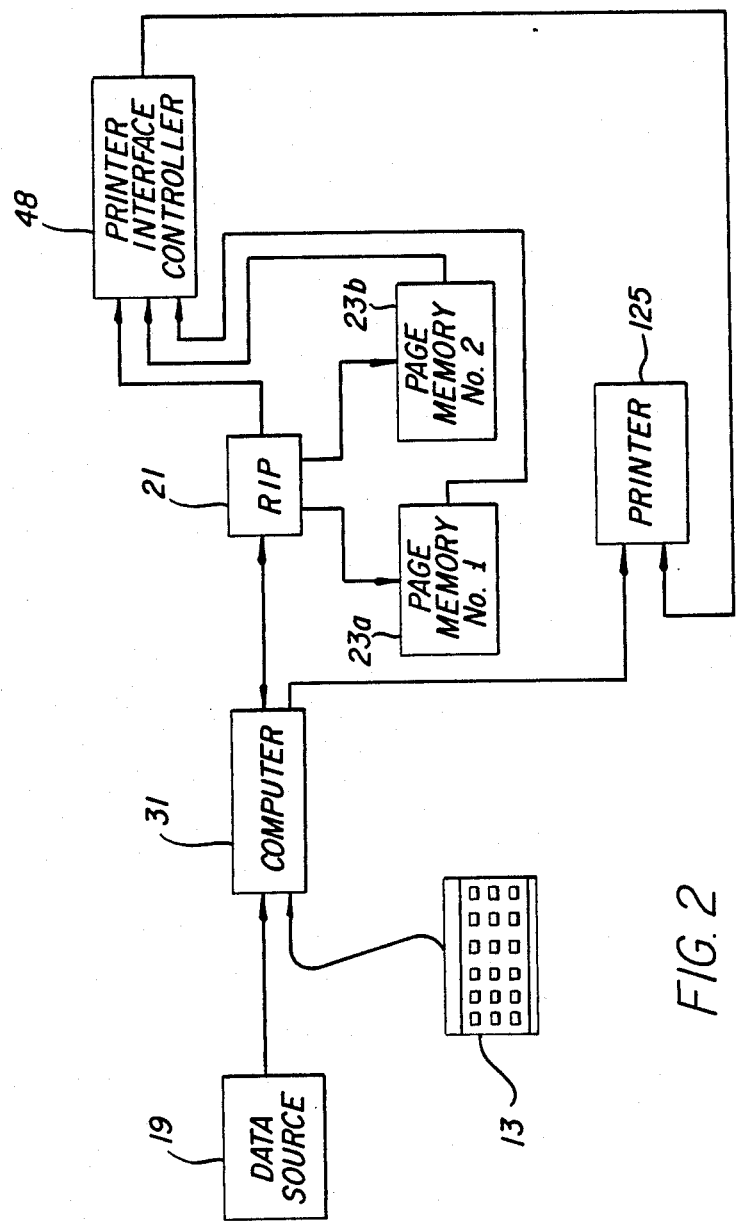
FIG. 2 is a block diagram of portions of the printer apparatus of FIG. 1.
Figure 3:
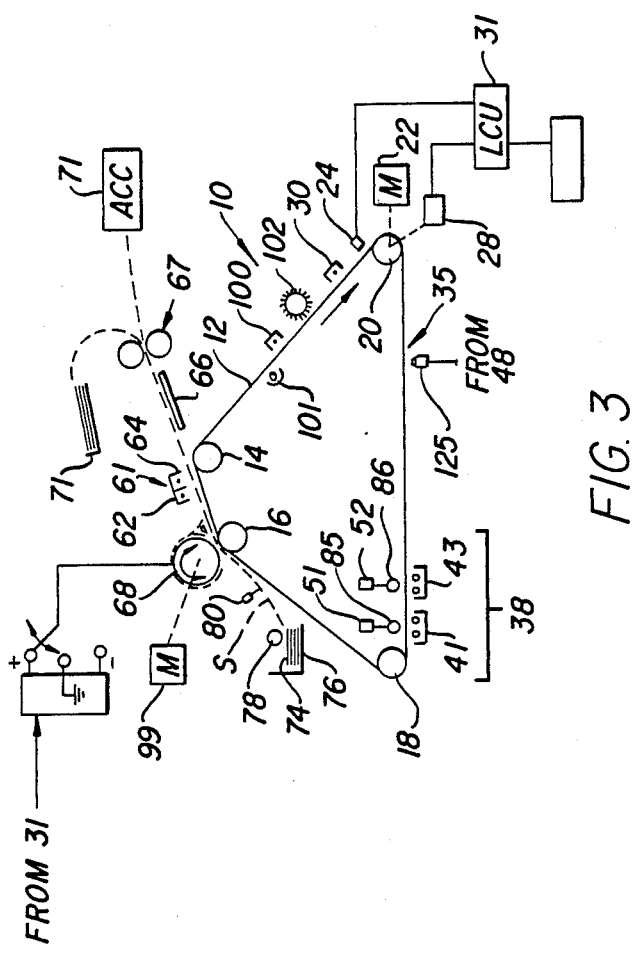
FIG. 3 is a side view of the subsystem stations in the printer apparatus of FIG. 1.

With reference to FIGS. 1-3, a schematic of an electrophotograhic reproduction apparatus is shown which comprises one form of printer suitable for use with my invention.

The apparatus 10 includes a closed loop, flexible image transfer member, or photoconductive web 12. The web 12, is supported on rollers 14, 16, 18 and 20. The rollers are mounted on the apparatus' frame (not shown) with one of the rollers, for example, roller 20, rotatively driven by a motor 22 to effect continuous movement of the web 12 in a clockwise direction about its closed loop path. The web has a plurality of sequentially spaced, nonoverlapping image areas which pass successively through electrophotographic processing stations (charge, expose, develop, transfer, clean) located about the path of the web. The web also includes timing marks (or regularly spaced perforations) which are sensed by appropriate means, such as timing signal generator 24 to produce timing signals. Such signals are sent to a computer controlled logic and control unit (LCU) 31. The LCU 31 controls the entire electrophotographic process based on the instantaneous location of the web in the travel path. An encoder 28 associated with the roller drive motor 22 also produces timing signals for the LCU. The signals from the encoder cause the LCU to fine tune the process timing. The LCU 31 has one or more digital computers, preferably a microprocessor(s). The microprocessor has a stored program responsive to the input signals for sequentially actuating, then de-actuating the work stations as well as for controlling the operation of many other machine functions.

Programming of a number of commercially available microprocessors such as one or more INTEL model 8086 microprocessors (which along with others can be used in accordance with the invention), is a conventional skill well understood in the art. This disclosure is written to enable a programmer having ordinary skill in the art to produce an appropriate control program for the microprocessor(s). The particular details of any such program would, of course, depend on the architecture of the designated microprocessor.

The LCU 31 typically comprises a temporary data storage memory, a central processing unit, a timing and cycle control unit, and a stored program control. Data input and output is performed sequentially under program control. Input data are applied either through input signals buffers to an input data processor or to an interrupt signal processor as is well known. The input signals are derived from various switches, sensors, and analog-to-digital converters. The output data and control signals are applied to storage latches which provide inputs to suitable output drivers, directly coupled to leads. These leads are connected to the various work stations, mechanisms and controlled components associated with the apparatus.

One or more corona charging units, exemplified by corona charger 30, is located upstream of the exposure area 35, and applies a uniform primary electrostatic charge, of say negative polarity, to the web 12 as it passes the charger and before it enters the exposure area. The photoconductive properties of the web cause the primary charge in the exposed areas of the web to be discharged in that portion struck by exposure light. This forms latent imagewise charge patterns on the web in the exposed areas corresponding to the image to be printed. Thereafter, travel of the web then brings the image frames into a development area 38. The development area has two magnetic brush development stations 41, 43, both containing toners having visible pigmentation. In the preferred embodiment, one will have toner of black pigmentation, the other contains toner of another color pigmentation, for example red. The toner particles are agitated in the respective developer stations to exhibit a triboelectric charge of the same polarity to the latent imagewise charge pattern. Backup rollers 85, 86, located on the opposite side of web 12 from the development area, are associated with respective developer stations 41, 43. Actuators 51, 52 selectively move respective backup rollers into contact with the web 12 to deflect the web from its travel path into operative engagement with respective magnetic brushes. The charged toner particles of the engaged magnetic brush are attracted to the discharged latent imagewise pattern areas to develop the pattern.

The logic and control unit 31 selectively activates an actuator in relation to the passage of an image frame that is to be processed with the respective color toner. Where the first image frame is to be developed with black toner and the second image frame is to be developed with the red toner and as the image frame containing the image to be developed in black reaches the development station 41, actuator 51 moves the backup roller 85 to deflect the web so that the latent charge image is developed by attracting black toner particles from the station 41. As soon as the image area leaves the effective development area of the station 41, the actuator 51 returns the backup roller 85 to its nondeflecting position. A similar cycle is accomplished by the logic and control unit 31 for the development of the second image frame or sector containing only the red toner from station 43. In this regard, actuator 52 and backup roller 86 are employed.

Developed black and red toned image frames must be transferred to a receiver sheet in accurately registered superimposed relation to form a hard copy having both the red and black toned images. Apparatus for providing such registered transfer are fully described in U.S. Pat. Nos. 4,477,176, issued Oct. 16, 1984 and 4,251,154, issued Feb. 17, 1981 in the name of Matthew J. Russel, the contents of which are incorporated herein by this reference. Briefly, this is accomplished by feeding a receiver sheet or support S of say plain paper, from a supply stack 74 stored in hopper 76, in synchronism with movement of the first image frame so that the receiver sheet engages the web and is registered by mechanism 80 with the first image frame. A transfer roller 68 includes a compliant insulating surface thereon and is biased to a potential suitable for transfer of the developed image on the first image sector to the receiver sheet S and to tack receiver sheet S to roller 68. Roller 68 is driven by a stepper motor 99 which receives actuating signals from the LCU 31.

Roller 68 may also be a biased vacuum roller or a roller with sheet clamping mechanisms to clamp the sheet to it.

Continued movement of web 12 and synchronized rotation of roller 68 brings the lead edge of the copy sheet back into transferable relationship with the web as the lead edge of the next toner image arrives at roller 68. At this point, the bias on roller 68 is reversed to repel sheet S away from roller 68 back into contact with web 12. Receiver sheet S will be carried by web 12 so that the receiver sheet is in registration with the image on the second image frame. This image is transferred to the receiver sheet by charger 61 including transfer charger 62 and detack 64. The copy sheet is separated from the web and conveyed by either vacuum transport or as shown air transport 66 to roller fuser 67 and then to exit hopper 71 or an accessory finishing unit 72. While the developed image is being fixed in fuser 67, the web 12 continues to travel about its path and proceeds through a cleaning area.

To facilitate toner removal from the web, a corona charging station 100 and a rear erase lamp 101 may be located upstream of a cleaning unit 102 to neutralize any charge remaining on the web and thus reduce the adherence forces of the toner to the web.

In order to form the imaging exposure the LCU in response to timing signals from the timing signal generator 24 and/or encoder 28 selectively illuminates through its output drivers light emitting diodes (LED's). The LED's may comprise a linear bank 125 of LED arrays situated transverse to and proximate the web surface. The array of LED's illuminate the web via a gradient index lens array (not shown), such as a SELFOC (trademark of Nippon Sheet Glass Co., Ltd.) array which focuses light from the linear array of fibers onto the photoconductor 12.

Electronic data signals are used to modulate the LED imaging source which is then imaged upon the photoconductor. The photoconductor may be in the form of a web or drum and, as is known, different image frames may actually comprise the same areas of the photoconductor but the frames exist at different times. Other imaging sources such as laser or other light emitting devices, electrographic devices, ink-jet thermal printers are also contemplated in implementing my invention. In the electrophotographic printer apparatus described, it is preferred to use a photoconductor and toning system that will attract toner particles to areas of the photoconductor that have been exposed. This is done since in most documents the background constitutes the major area of the document. For reproduction of the first image frame the LCU, via a printer interface controller 48, activates the LED printer array 125 to output a beam of light to expose each pixel size area for information to be reproduced in black. Similarly, for exposure of the information to be reproduced with the red pigmented toner on the second frame the signals from the LCU illuminate the LED printer array to "print out" only that information which is to be developed with this toner.

A data source such as a computer, word processor, image scanner or facsimile or the like provides a stream of digitally coded data signals to the LCU's input signal buffers. As shown in FIG. 1, the data source may comprise a disk drive 19a and magnetic data storage disk 19b that form a part of the printer apparatus 10. The coded data signals may be ASCII or other types of coded signals with no information distinguishing which of the data is to be color highlighted. This type of data may be referred to as non-color differentiated data or black bit type data, since it would normally all be printed in hard copy printers in one color, usually black, and transferred to, for example, white copy sheets. An alpha numeric keyboard 13 is also coupled to the printer to allow an operator to select which data is to be printed in the accent color which will be red in this example.

Figure 4:
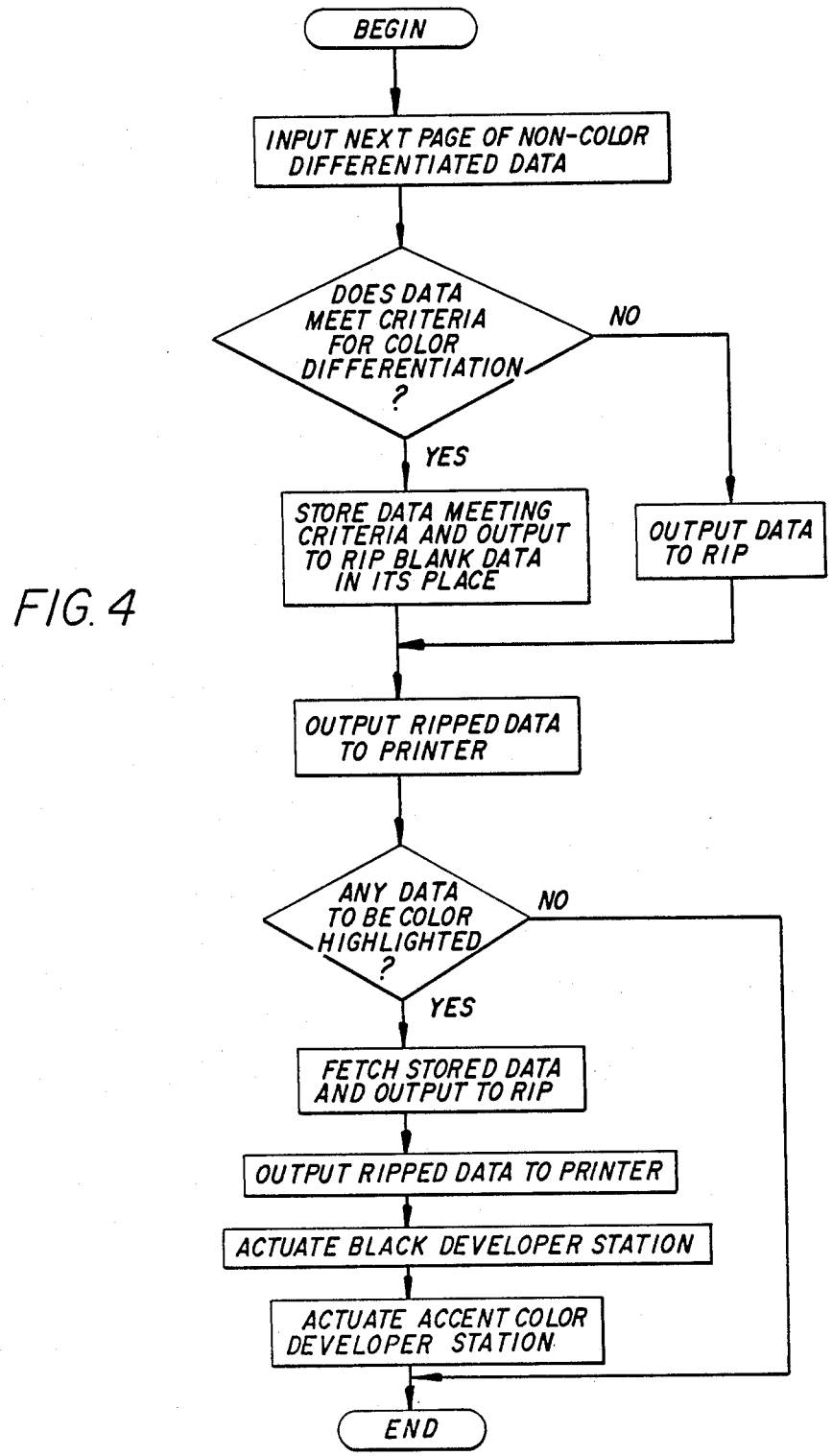
FIG. 4 is a flowchart for a program for operating the computer controlled printer of FIG. 1 in accordance with one mode of operation.

With reference now to the flowchart of FIG. 4, a program is provided allowing the operator to identify via inputs to the keyboard the selected data to be accent colored. For example, where a document is digitally stored on magnetic media and represents an accounting document, the operator may wish to have all data in the document indicating losses be in red with the rest of the document printed in black. Losses are generally indicated by placing a number within parentheses and also include a monetary designator symbol, e.g., a dollar sign. When the operator desires to enter the intelligent accent color mode, he presses an appropriate predetermined button the keyboard for calling up this special accent color program. A prompt message provided in the program and communicated to the operator on monitor 17 requests identification of the data that is to be color accented. Assume he chooses all data having the following character accent color criteria set: ($ . . . ).

The computer is programmed to recognize that a parenthesis begin character followed by a dollar sign and then by any numerical characters (including a decimal point) and then by a closed parenthesis character represents the character criteria set. All digitally coded data from the data source is examined by the microcomputer to see if it meets the programmed character criteria. Data not meeting the criteria are output to a raster image processor (RIP) 21 for bitmapping into a page memory 23a that will be used to image the page of data on an image frame to be developed with black toner. For any data meeting the character criteria, the computer sends out a signal identical to a command for a space corresponding to the space each character would take up. In the simple case where no proportional spacing of character printing is provided, the computer stores the data meeting the character accent color criteria and merely transmits to the raster image processor a space signal for each character in the data set meeting the character criteria. Along with storage of the data meeting the character criteria, the computer stores the location of the data on the page; i.e., the line it is on as well as the location of the data on that line. For example, assume that the microcomputer in the course of comparing incoming data with the character criteria set has found a match that consists of the following data set: ($7000.59). The microcomputer stores this information and for each character member of the set sends a signal to the RIP of ten space signals. As the RIP is rasterizing the data incoming to it and bitmapping same into page memory the space signals are bitmapped as say all logic "0" so that when this data is imaged and toned, no toned image is placed in the area on the black developed image frame for the deleted set of information meeting the character criteria. After a full page of data has been sent to the RIP, the microcomputer sends to the RIP the data set meeting the character accent color criteria. The microcomputer will also send a series of space commands so that the RIP can format a page that consists of all logic "0", but for the data meeting the character criteria which is bitmapped in its proper location in page memory 23b. This page memory will then be printed by the imaging source 125 on the next image frame and will be developed with red toner in accordance with the techniques described above. The developed black and red toner image frames are then transferred in register onto the copy sheet S and the respective images fixed by fuser rollers. The resulting document represents a reproduction in the respective desired colors of the data even though the original data source provided no distinction in information as to what colors the information is to be reproduced in.

Figure 5:
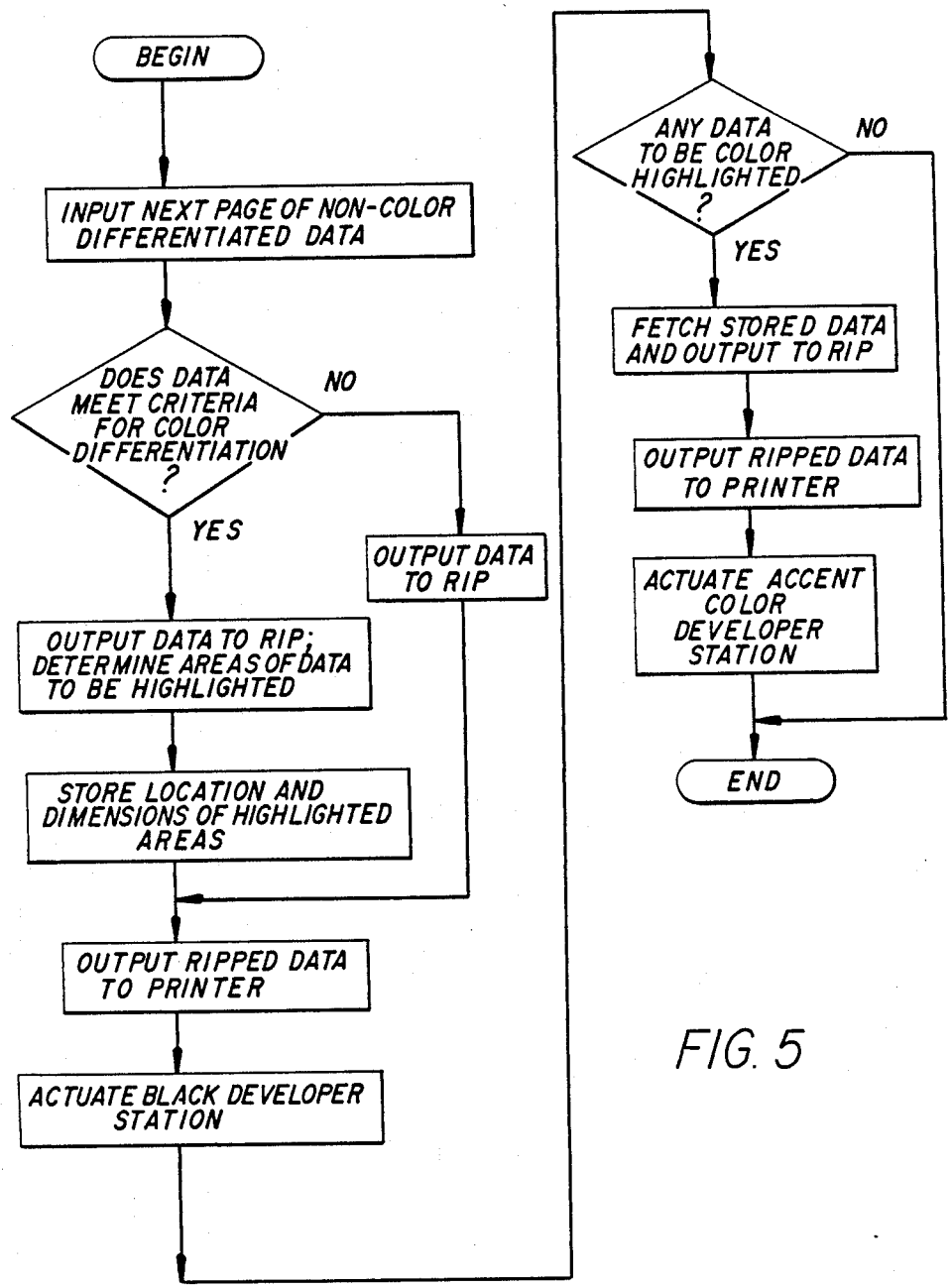
FIG. 5 is a flowchart for a program for operating the computer controlled printer of FIG. 1 in accordance with a second mode of operation.

Reference will now be made to the flowchart of FIG. 5 which represents a flowchart for an alternative program that may be requested. In lieu of printing of data in different colors, it may be desired to merely highlight in yellow the area meeting the character set criteria. In this embodiment, assumption will be made that the red developer unit has been replaced by a yellow developer unit. Thus, all data is printed in say black but the area immediately around the set of data meeting the character criteria is yellow. The appearance of such a document would be similar to documents where portions are highlighted by overwriting with a highlighter marker pen. In this program the microcomputer, as before, compares the operator inputted character accent color criteria set with incoming non-color differentiated data signals from the data source. When a set of data meets the criteria, the number of characters in this set is counted and stored along with the location of the set on the page; i.e., line and location on line. All the data for the page is sent to the RIP and bitmapped in page memory 23a. The bitmapped page memory is then imaged by LED printer array 125 on an image frame that is developed with black toner. After the RIP 21 has bitmapped the page to be printed in black, the microcomputer sends to the RIP a string of space signals as well as an inverse space signal. The space signals are used to place digital logic "0" level signals in page memory 23a in all locations but for the area that would be assigned to the set of data meeting the character criteria. An inverse space signal is defined as a signal that will place digital logic "1" signals in an area which would otherwise be assigned as a character space. Thus for each character in the set meeting the criteria, a block of area in page memory is filled the digital logic signals "1" at the position in page memory where the character would have resided for the embodiment described in the flowchart of FIG. 4. The signals of page memory 23b are sent to be printed on the next image frame and developed with yellow toner and transferred to the same copy sheet in register with the first image. There is thus provided a two-color printed document where all the letters are printed in one color with highlighting of the character set of interest. To improve on image quality, particularly where the yellow toner is not very transparent, it may be desired to transfer the yellow toner image first to the copy sheet and have the black toner image superimposed upon the yellow toner.

Figure 6:
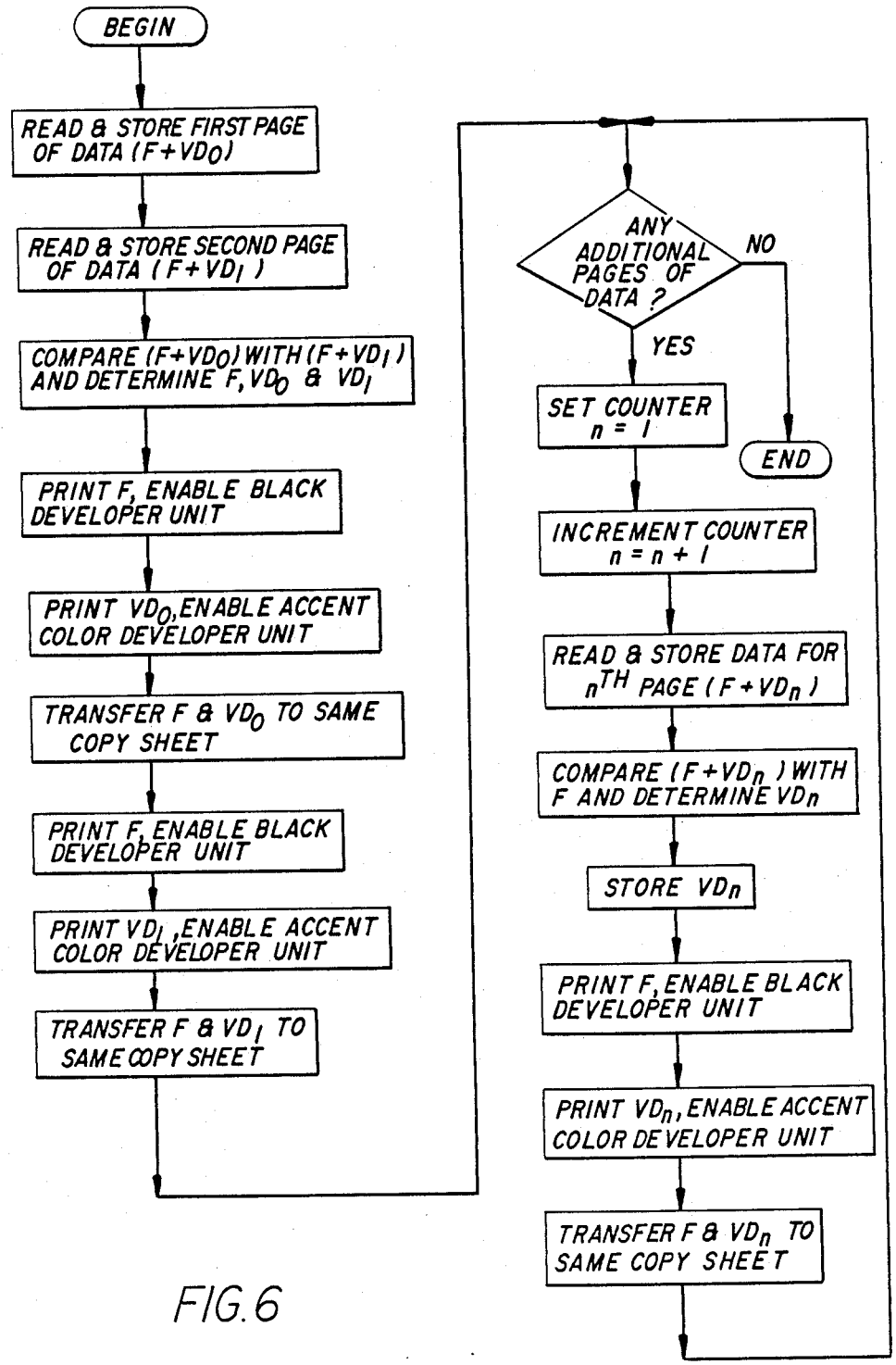
FIG. 6 is a flowchart for a program for operating the computer controlled printer of FIG. 1 in accordance with a third mode of operation and FIG. 7 is a flowchart for a program for operating the computer controlled printer of FIG. 1 in accordance with a fourth mode of operation.
Figure 7:
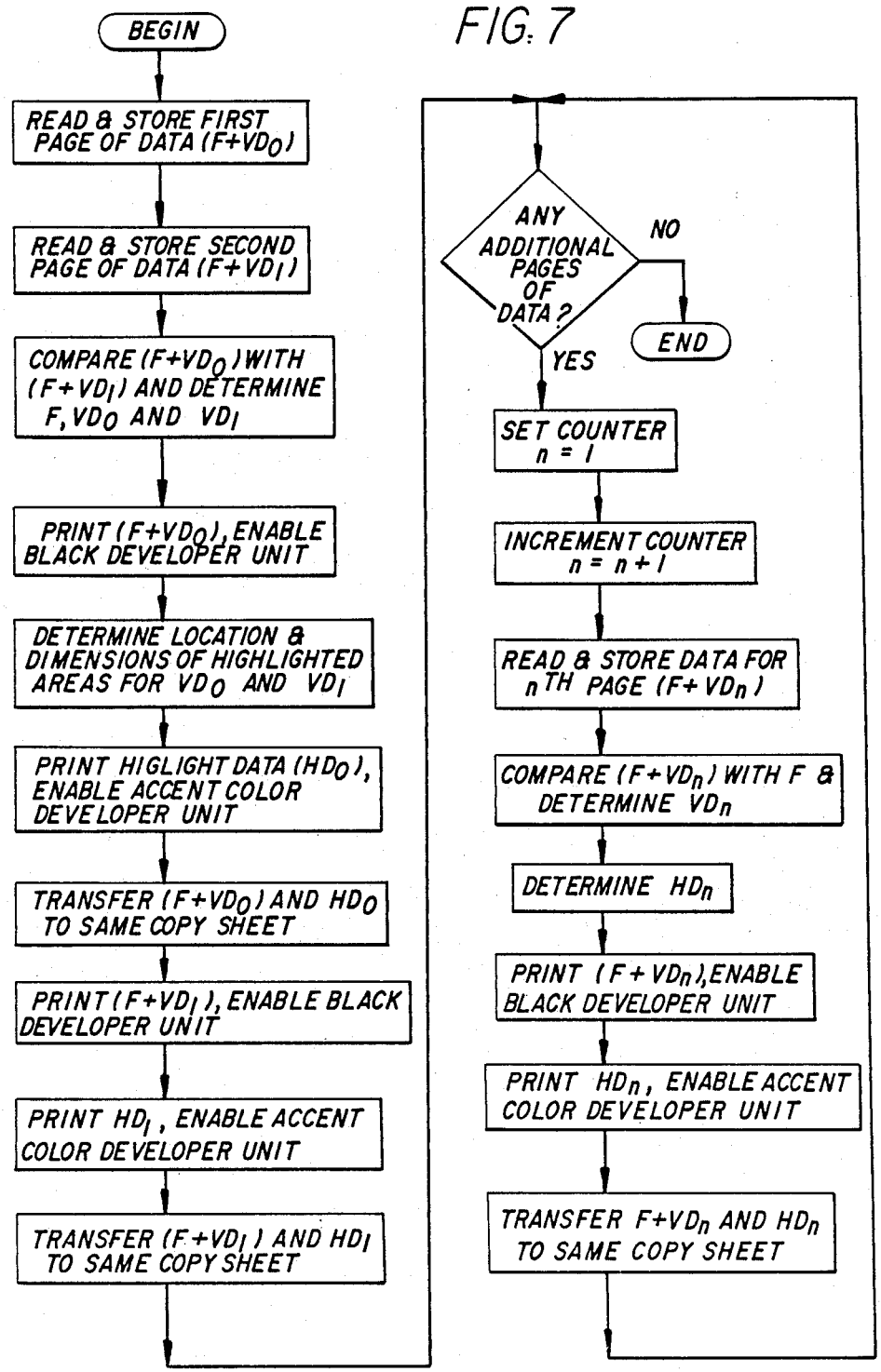

The next embodiment will be described with regard to the flowchart of FIG. 6. In this embodiment, the printer is placed in a mode wherein a multisheet document is printed out and color highlighted in areas where the data differs. This is particularly desirable wherein experiments are conducted and repeating data obtained that consists of fixed information and variable information. It would be desirable to have the variable information highlighted to facilitate reading of the reports. The first page of data is read and stored by the microcomputer. The next page of data is also read and compared with the first page of data. From the comparison of the two pages a determination is made as to what is fixed data (F); i.e., information common to both pages and what is variable data for each ($VD_0$ and $VD_1$); i.e., information not common to both pages. The fixed data is set to the RIP 21 for bitmapping into page memory 23a and then to the print array 125 which images the fixed information onto the first image frame that is to be developed with black toner. As before the locations of the variable data for the first page ($VD_0$) are replaced by signals denoting a space for each character forming a part of $VD_0$. The variable data for the first page ($VD_0$) is then sent to the RIP for bitmapping in page memory 23b and as in the other embodiments, signals denoting a space are substituted for the fixed information. The variable data ($VD_0$), after being bitmapped, is sent to the print array 125 for printing on the next image frame. The two image frames are transferred in register to the same copy sheet and a two-color reproduction of fixed and variable information is provided wherein the variable information is color highlighted in say red. The data for the next page is printed in similar manner. The subsequent pages of data are compared with the initial determination of what constitutes the fixed information (F) and the variable data ($VD_n$) found in the data of subsequent pages will be printed in the accented or highlighted colors. Other algorithms also may be used for determining what is the variable data. Thus, the variable data may be that which differs from the page immediately preceding, rather than the first page. Also, the first page may be identified as a form and have only fixed data. All subsequent pages are then compared with this fixed data and have the variable information color highlighted. In lieu of printing the data in a different color, the data may be printed in all the same color but color highlighted as described for the embodiment illustrated by the flowchart of FIG. 5, where the second color toner is employed to highlight the variable data. In this regard, reference will now be made to the flowchart of FIG. 7. In this mode, the first and second pages of incoming non-color differentiated data signals are read, stored and compared by the computer. A determination is made as to what is the fixed data (F), i.e., data common to both pages and what is the respective variable data ($VD_0$) and ($VD_1$). All the data ($F+VD_0$) for page 1 is then sent to the RIP 21 to be rasterized and bitmapped in page memory 23a. The signals in page memory 23a are then sent to be imaged by LED print array 125 on a first image frame on web 12 via printer controller 48. The black developer unit is actuated and the image of page 1 on this image frame is developed and tranferred to copy sheet S. The computer 31 also sends to the RIP 21 the data signals representing the location and dimensions of highlight data for page one ($HD_0$). The highlight data represents an area that would be assigned to each character in the data of page 1 that forms a part of the set of characters that have met the character accent color criteria. In the examples of FIGS. 6 and 7, the criteria is established by the computer that is programmed to distinguish between fixed and variable data, whereas in the examples of modes described in FIGS. 4 and 5 the operator selects a particular character criteria he wishes to see highlighted. The highlighted data ($HD_0$) is bitmapped in page memory 23b with logic level "1" in the areas to be highlighted and with logic level "0" in the areas not to be highlighted. The bitmapped data is then sent to be printed line-by-line by LED print array 125 on a second image frame of web 12. A signal is also sent to the developer unit containing the yellow toner for developing this image frame. The two developed image frames are transferred in register on copy sheet S. Similarly, the data for the second page is printed and highlighted as are the subsequent pages of data in accordance with the flowchart of FIG. 7. Thus, there is provided a multipage document where all the data is printed in one color but the variable data is highlighted in another color.

It will be appreciated that the invention improves upon the prior art which requires that the data to be accent colored be identified with a signal indicating the color to which it is printed or wherein area information needs to be provided to selectively accent color certain information. In the invention described a character accent color criteria is established and the creation of accent color achieved in an efficient and expeditious manner.

Still other modifications may be realized in accordance with the invention including the generating of a color outline highlighting, rather than "painting" with an accent color the contiguous areas of the data meeting the character accent color criteria.

The invention has been described in detail with particular reference to preferred embodiments thereof. However, it will be understood that variations and modifications may be effected within the spirit and scope of the invention.

I claim:

1. A printer apparatus comprising:
    first means for providing data signals representing non-color differentiated character data information to be printed;
    second means for comparing data signals forming one page of character data with data signals representing a second page of character data to determine the data common to both pages; and
    third means responsive to the determination of said second means to print said one and second pages of data on respective record members with data not common to both said one and second pages color highlighted in a color different than that used to print on said record members the character data information common to both said one and second pages.

2. The printer apparatus of claim 1 and wherein the third means provides on a record member a field of color on the areas adjacent that occupied by the data not common to both said one and second pages.

3. A printer apparatus comprising:
    means for providing data signals representing non-color differentiated financial data information to be printed;

first means for establishing a negative data accent color criteria;
second means for comparing the said data signals with the said criteria;
third means responsive to data signals meeting the criteria for printing the said financial data information so that data signals meeting the criteria have their corresponding data information highlighted on a record member in a color different than that used to print the financial data information not meeting the criteria.

* * * * *